United States Patent [19]

Vernay

[11] Patent Number: 4,808,978
[45] Date of Patent: Feb. 28, 1989

[54] DISPLAY SYSTEM COMPRISING A TRANSPARENT EMISSIVE SCREEN

[75] Inventor: Michel Vernay, Paris, France

[73] Assignee: Sintra, Asnieres, France

[21] Appl. No.: 794,789

[22] Filed: Nov. 4, 1985

[30] Foreign Application Priority Data

Nov. 6, 1984 [FR] France ................. 84 16874

[51] Int. Cl.⁴ .......................................... G02B 23/00
[52] U.S. Cl. ................. 340/705; 340/980; 350/407; 350/399
[58] Field of Search .............. 340/705, 980; 350/174, 350/352, 394, 395, 399, 407, 284, 276 R, 276 SL

[56] References Cited

U.S. PATENT DOCUMENTS

| | | | |
|---|---|---|---|
| 2,793,361 | 5/1957 | White | 350/399 |
| 2,819,459 | 1/1958 | Podd | 350/399 |
| 3,272,064 | 9/1966 | Hyndman | 350/399 |
| 3,899,786 | 8/1975 | Greubel et al. | 340/705 |
| 3,932,861 | 1/1976 | Bull | 340/705 |
| 4,105,912 | 8/1978 | Senger | 358/103 |
| 4,151,411 | 4/1979 | Derderian et al. | 350/407 |
| 4,181,405 | 1/1980 | Cohen | 350/331 R |
| 4,202,601 | 5/1980 | Burbo et al. | 350/407 |
| 4,447,128 | 5/1984 | Ferber | 350/174 |
| 4,550,984 | 11/1985 | Reymond | 350/404 |
| 4,595,262 | 6/1986 | Ogle | 350/407 |
| 4,636,866 | 1/1987 | Hattori | 340/705 |
| 4,687,072 | 8/1987 | Komuro | 340/705 |

FOREIGN PATENT DOCUMENTS

| | | | |
|---|---|---|---|
| 0087998 | 9/1983 | European Pat. Off. | |
| 3120601 | 12/1982 | Fed. Rep. of Germany | 340/705 |
| 2544111 | 10/1984 | France | 350/352 |
| 0136534 | 8/1983 | Japan | 340/705 |
| 2126328 | 3/1984 | United Kingdom | 340/705 |

OTHER PUBLICATIONS

IBM Technical Disclosure Bulletin, vol. 12, No. 5, Oct. 1969, p. 692, New York, U.S.; L. T. Lemke: "Intensity Control System Using Crossed Linear Polarizers".

Primary Examiner—John W. Caldwell, Sr.
Assistant Examiner—Alvin Oberley
Attorney, Agent, or Firm—Oblon, Fisher, Spivak, McClelland & Maier

[57] ABSTRACT

A device for weakening the incident light passing through a transparent emissive display system so as not to drown the emitted light is disclosed which utilizes two polarizing filters one at least of which is placed before the screen so as to selectively attenuate the incident light. A photoelectric cell measures this incident light and controls a motor which rotates one of the filters so as to adjust the attenuation to the initial intensity.

4 Claims, 1 Drawing Sheet

FIG_1
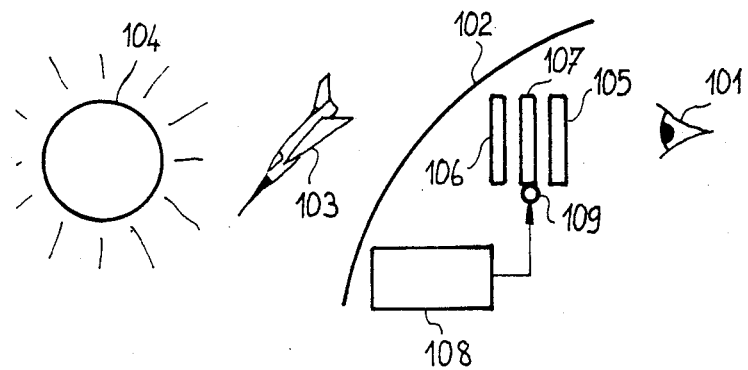
FIG_2
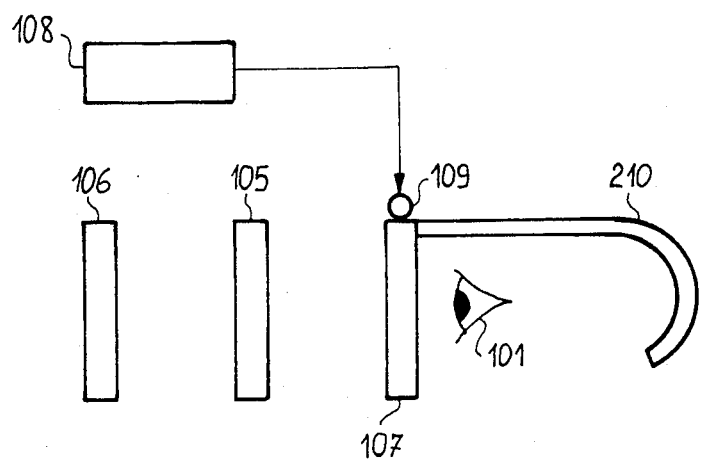

DISPLAY SYSTEM COMPRISING A TRANSPARENT EMISSIVE SCREEN

BACKGROUND OF THE INVENTION

1. Field of the Invention

The present invention relates to display systems comprising a transparent emissive screen which allows the display simultaneously of the information displayed by the screen and that seen by transparency therethrough.

2. Description of the Prior Art

For a long time it has been known to use in aircraft collimators allowing a sighting reticle to be formed by reflection on a semi-transparent mirror which is superimposed on the scene, a target for example, seen through the glass of the cabin. The luminosity of such a collimator may be adjusted so that the reticle is not drowned in the external light, that of the sun seen face on for example. On the other hand, the reflection from the mirrors introduces at least a partial polarization which in practice prevents the use of polarizing filters for attenuating the external light.

It has recently been proposed to use, for constructing a collimator and generally any display device called "head high", a transparent emissive screen which may be placed directly in the path of the external light rays. Thus the equipment is greatly simplified. However, the luminosity of such a screen is too low with respect to that of the sun, but there is however no phenomenon of polarization intrinsic to such a device.

SUMMARY OF THE INVENTION

In order to be able to observe simultaneously the information displayed on a transparent emissive screen and an external scene observed therethrough, the invention proposes to attenuate the luminosity of this external scene in an adjustable way without attenuating that of the screen by using two polarizers crossed by a variable angle and one at least of which is placed between the external scene and the screen.

Other features and advantages of the invention will be clear from the following description, given by way of non limitative example with reference to the accompanying Figures which show:

BRIEF DESCRIPTION OF THE DRAWINGS

FIG. 1, a schematical view of a pilot looking through a device in accordance with the invention at an aircraft situated between the sun and himself;

FIG. 2, a schematical view of a variant of the device of FIG. 1.

DETAILED DESCRIPTION OF THE INVENTION

In FIG. 1, the pilot 101 of an aircraft observes through the glass 102 of the cabin another aircraft 103 situated between the sun 104 and himself. A display screen 105, of the transparent and emissive type, allows him to see at the same time indications concerning aircraft 103, identification and firing data for example.

In order to attenuate the light of the sun, between the glass 102 and screen 105 have been placed two polarizing filters 106 and 107, one of which (106) is fixed and the other (107) may rotate in its plane so as to cross its direction of polarization to a greater or lesser degree with that of the fixed polarizer.

By a well known effect, the light which passes through the assembly of these two polarizers is attenuated to a greater or lesser extent depending on the angle which the directions of polarization of these two polarizers form therebetween. Thus the luminosity of the external scene may be adjusted so that it does not drown that of the screen 105 and so that the indications thereon remain visible for the pilot 101, superimposed on the image of the aircraft 103.

This adjustment may be made automatically by means of a photoelectric cell 108 which controls a motor 109, which rotates screen 107 through gearing.

The relative positions of the display screen and the polarizers may change, the essential thing being that one at least thereof is between the screen and the scene to be observed so as not to darken the screen also. In particular, polarizer 107 may be fixed and polarizer 106 orientatable, and polarizer 107 may be situated between the screen 105 and the pilot 101.

An interesting variant consists in using spectacles 210 worn by the pilot 101 and whose glasses 107 are polarizing. A micromotor 109 fixed to the spectacle mount controls the rotation of these glasses under the control of a cell 108. This allows the position to be partly freed where screen 105 is situated.

A simplification of this variant consists in using two polarizers with different orientations for the glasses of the spectacles. Thus, they are lighter and the pilot may choose the desired attenuation by closing one eye.

The invention is not limited to the case of a display screen in an aircraft. It extends on the contrary to all instruments which comprise display means inserted in an optical path, and in particular to the reticles of view finders, telemeters, prism binoculars and binoculars. These latter, which have two optical paths, may benefit from the differentiation of the attenuation.

What is claimed is:

1. A display system of the type comprising a transparent emissive display screen allowing light information to be displayed and placed in an optical path intended to transport the image of an external scene, further comprising at least a first polarizing filter placed in the same optical path between said external scene and said screen, at least a second polarizing filter placed in the optical path and means for variably crossing the polarizing filters with respect to each other so as to adjust the luminosity of the image of the external scene seen through said first and second polarizing filters without obscuring the information displayed on the screen wherein the means for crossing the filters comprise a photoelectric cell disposed outside the optical path of said first and second polarizing filters for measuring the luminosity of the external scene and for controlling a motor for rotating one of the polarizing filters.

2. A display system as claimed in claim 1, further comprising a spectacle mount for supporting said second polarizing filter.

3. A display system as claimed in claim 2 comprising means for orienting said second polarizing filter on said spectacle mount.

4. A display system as claimed in claim 1, wherein the transparent emissive display screen is placed between said first and second polarizing filter.

* * * * *